March 29, 1949.   E. PROBST   2,465,478
FISHING FLY HOLDER
Filed July 31, 1945
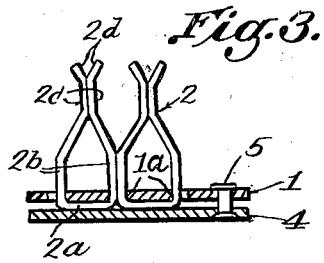
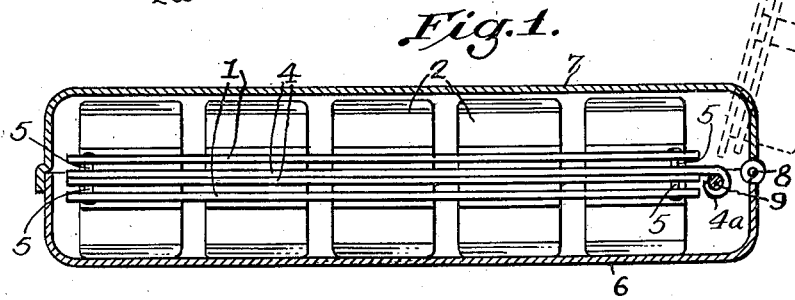
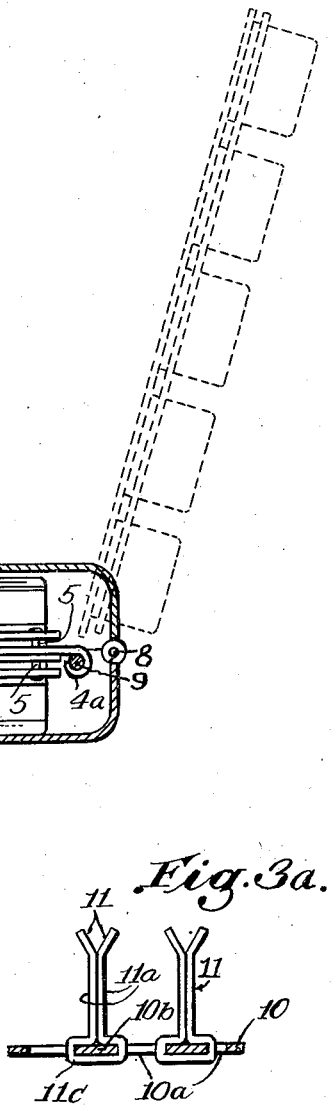
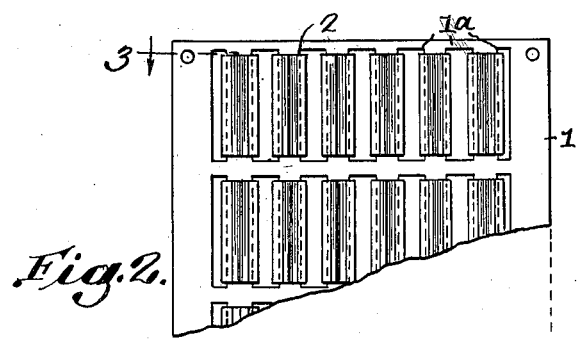
INVENTOR,
Emmet Probst,
BY John W. Steward
ATTORNEY.

Patented Mar. 29, 1949

2,465,478

UNITED STATES PATENT OFFICE 2,465,478

FISHING FLY HOLDER

Emmet Probst, Mountain View, N. J.

Application July 31, 1945, Serial No. 607,923

2 Claims. (Cl. 43—32)

1

The conventional holder for fishing flies or for fishhooks having attached snells comprises a holder proper, usually planiform, as the bottom wall of a box or case or one of the stiff pages of a book-like assembly, and strips of stiff material affixed to the holder proper in face-to-face relation thereto and having tang-like projections extending laterally therefrom, the hooks being adapted to be engaged under the projections and so subject to clamping by them and the holder proper, being confined to the latter in flatwise state. By this construction the hooks, because of their flatwise disposition, occupy undue space which cannot be avoided by adapting the holder to support them in a closer relation without their overlapping each other so that their selective removal or replacement would be quite difficult.

The object of this invention is to provide a holder for the purpose indicated by which any one fly or equivalent may be readily removed or replaced, being securely held when in place, and by which a large number of flies or equivalent may be accommodated.

In the drawing,

Fig. 1 is a view showing, contained in a box or case which appears in section, two of the improved holders in said elevation, the top one of the holders being pivoted to the bottom section of the case, the bottom holder lying unconnected to the case in the bottom section of the latter;

Fig. 2 is a fragmentary plan of one of the holders;

Fig. 3 is an enlarged fragmentary sectional view on line 3, Fig. 2, and

Fig. 3a is a fragmentary sectional view somewhat similar to Fig. 3 but showing a modified form of the holder.

What I term a "fishing hook holder" (meaning thereby one to receive fishing hooks whether or not they are fitted with material by which flies are formed, or with snells, etc.) includes a flat stiff body portion having hook-clamping clips projecting rigidly from one broad face thereof, each clip comprising a pair of flat stiff clamping jaws in closely facing relation to each other and having the portions of their adjoining faces which are remote from said body portion preferably diverging from each other to facilitate entry of a hook between them. When the holder is thus formed each hook is readily enterable and removable from a clip without interfering with adjoining hooks held by the clips, and each hook will occupy but a quite limited space and be confined to a definite position when clamped by a clip, i. e.,

2 with both its shank and barbed end subject to the clamping.

Referring, first, to Figs. 1 to 3:

The flat stiff body portion is designated 1 and may be formed of any suitable sheet material, as metal. The clips, projecting rigidly from one broad face of the body portion, are designated 2. In the example, in which the device is composed of assembled parts, the construction is as follows:

A supporting member forming said body portion will usually be rectangular in plan as seen in Fig. 2 which shows its margin partly by full lines and partly by broken lines, it having rows of apertures in the form of slots 1a. The rows are here of equal length and parallel and the slots of each row are also parallel and of equal length and they are equidistant from each other.

The clips 2 are formed and attached to member 1 as follows: Each clip is formed of a stiff somewhat elastic blank of sheet material, as metal, which is rebent to approximately U-shaped form and at a suitable distance from its preferably flat base 2a has its terminals 2b first converging toward and then lying parallel and close to each other to form its clamping jaws, as at 2c, the free ends of such terminals having at least their adjoining faces diverging, as at 2d. Said terminals of each clip penetrate two adjoining slots 1a in a common row and each such slot is penetrated by the adjoining terminals of two adjoining clips. By this arrangement a considerable number of clips are accommodated. The clips 2 have a width which is substantially equal to the length of the slots 1a, as shown in Fig. 2.

To confine each clip in its illustrated projecting relation to member 1 and in fixed state a backing member 4, also of stiff sheet material, is desirably secured to member 1, as by rivets 5, in opposing relation to the broad face thereof opposite to that from which the clips project, it coacting with member 1 to clamp the clips as shown in Figs. 1 and 3.

A plurality of the holders thus formed may be packed in superposed state, as in a case 6 here shown provided with a cover 7 pivoted to the case at 8. Any one or more of the holders may be pivoted in the case so as to assume a position (dotted outline, Fig. 1) uncovering the one below it. In the present example this is true of the upper holder whose member 4 has a hinge-forming extension 4a penetrated by a pivot in the form of a pintle 9 supported by side walls of the case and preferably parallel and near to pivot 8. In the embodiment shown in Fig. 1, the two holders shown appear arranged with their backing members adjacent each other. In such embodiment the lower holder merely lies in the bottom section of the case, unconnected to such case. When the cover 7 of the case is opened, access is had to the hooks or flies held by the upper holder. When the case is inverted so that cover 7 rests on the bottom, however, the raising of case portion 6 then gives access to the hooks or flies in the holder shown at the bottom in Fig. 1.

In Figure 3a there is shown another embodiment of the fishing hook holder of the invention. In such embodiment, there is no necessity for the presence of a clip retaining member beneath the perforated sheet 10 carrying the hook clamping members, because such members themselves are bent substantially completely around the portions of the stock of the sheet between the apertures therethrough. Although useful, such second embodiment is not preferred, because it does not afford the security of holding of the hook clamping members, nor does it yield the economy of space given by the previously described embodiment shown in Figs. 1, 2, and 3.

In Fig. 3a 10 designates the member forming the flat stiff body portion of the holder and 11 designates the clips.

The member 10 is substantially the same as member 1 except that its slots 10a are shown wider.

The clips 11 are formed and attached to member 10 as follows: Each is formed, like the clips 2, of a stiff somewhat elastic blank of sheet material, as metal, which is rebent to have its terminals 11a, forming its clamping jaws, extend generally in the same direction and closely facing each other, the free ends of such terminals having their adjoining faces 11b diverging. Said terminals of each clip penetrate adjoining slots 10a of member 10. To confine each clip in this example to projecting and rigid relation to member 10 its base-including portion 11c exists as a loop tightly embracing the portion 10b of member 10 between its slots.

In each form, because each clip includes a pair of terminals providing clamping jaws and having their free ends remote from the member 1 or 10, any hook is readily enterable or removable from between the jaws.

The form of clip shown in Fig. 3 is preferred because of its more effective clamping action on hooks varying in gage or thickness. In this form, for example, the members 1–4 form what I term a supporting structure which (here by its portion 4) confines each clip against movement in the direction opposite to that in which its terminals project.

Having thus fully described my invention what I claim is:

1. A fishing hook holder comprising a clip support formed of a sheet of stiff material having at least three parallel elongated apertures therein, consecutive apertures being identified as aperture number one, number two, and number three, respectively, such apertures extending through the broad top and bottom surfaces of the sheet and being close to each other and substantially equally spaced apart, a pair of clips bent from flat stiff material, each clip having a flat bottom, two upstanding arms which are substantially parallel for some distance from the bottom, the upper ends of each arm converging upwardly and then lying parallel to each other and in substantial contact for an appreciable distance to form hook clamping jaws, the clips being mounted in the clip support so that their jaws lie on the same side of the support, one arm of the first clip extending through aperture number one, one arm of the second clip extending through aperture number three, and the remaining two arms of the clips extending through number two in close side-by-side relationship, and means to retain the inner surface of the bottoms of the clips substantially in contact with the bottom broad surface of the supporting sheet of stiff material between the apertures.

2. A fishing hook holder comprising a clip support formed of a sheet of stiff material having at least three parallel elongated apertures therein, consecutive apertures being identified as aperture number one, number two, and number three, respectively, such apertures extending through the broad top and bottom surfaces of the sheet and being close to each other, substantially of equal length and equally spaced apart, and lying in a straight row, a pair of clips bent from flat stiff material, of a width substantially equal to the length of the apertures, each clip having a flat bottom, two upstanding arms which are substantially parallel for some distance from the bottom, the upper ends of each arm converging upwardly and then lying parallel to each other and in substantial contact for an appreciable distance to form hook clamping jaws, the clips being mounted in the clip support so that their jaws lie on the same side of the support, one arm of the first clip extending through aperture number one, one arm of the second clip extending through aperture number three, and the remaining two arms of the clips extending through aperture number two in close side-by-side relationship, and means to retain the inner surface of the bottoms of the clips substantially in contact with the bottom broad surface of the supporting sheet of stiff material between the apertures.

EMMET PROBST.

REFERENCES CITED

The following references are of record in the file of this patent:

UNITED STATES PATENTS

| Number | Name | Date |
| --- | --- | --- |
| 604,909 | Smith | May 31, 1898 |
| 1,371,148 | Dice | Mar. 8, 1921 |
| 1,482,678 | Figley | Feb. 5, 1924 |
| 1,737,376 | Knettles | Nov. 26, 1929 |
| 1,927,110 | Bannister et al. | Sept. 19, 1933 |